United States Patent [19]

Katayama

[11] Patent Number: 5,353,434
[45] Date of Patent: Oct. 4, 1994

[54] NON-CONTACT IC RECORDING MEDIUM

[75] Inventor: Yosuke Katayama, Toride, Japan

[73] Assignees: Hitachi Maxell, Ltd., Osaka; NTT Data Communications Systems Corporation, Tokyo, both of Japan

[21] Appl. No.: 710,155

[22] Filed: Jun. 4, 1991

[30] Foreign Application Priority Data

Jun. 5, 1990 [JP] Japan .................. 2-145507

[51] Int. Cl.⁵ .............................................. G06K 7/00
[52] U.S. Cl. .................................................. 395/550
[58] Field of Search ............... 235/449, 442, 492, 493; 340/825, 825.34, 825.54, 825.3, 825.35, 825.62, 825.68, 825.69; 395/725

[56] References Cited

U.S. PATENT DOCUMENTS 4,720,626  1/1988  Nishikawa et al. .............. 235/449
4,888,585 12/1989  Kamiya et al. .................. 340/825.4
5,113,184  5/1992  Katayama ....................... 340/825.54

FOREIGN PATENT DOCUMENTS 0289136  3/1988  European Pat. Off. .
0309201  9/1988  European Pat. Off. .
61-226888 10/1986  Japan .
WO91/01531  7/1990  PCT Int'l Appl. .

OTHER PUBLICATIONS

International Search Report

Primary Examiner—Dale M. Shaw
Assistant Examiner—Sang Hui Kim

[57] ABSTRACT

An IC recording medium for executing data transmission/reception without contact with a reader/writer. The non-contact IC recording medium comprises a first circuit for detecting a synchronization (sync) signal sent from a reader/writer to generate a first clock signal, a second circuit for generating a second clock signal having a predetermined frequency relationship with the clock signal for driving the data processing in a signal processing circuit incorporated therein, a third circuit for writing m (where m is an integer of 2 of greater) number items of transfer information output from the signal processing circuit using the second clock signal and reading them using the first clock signal, a fourth circuit for creating an interruption signal from the start bit in at least the first transfer information in the m number of items of transfer information to place the subsequent m number of items of transfer information in a wait state, and a fifth circuit for releasing the wait state of the subsequent m number of items of information by the fourth means.

10 Claims, 5 Drawing Sheets

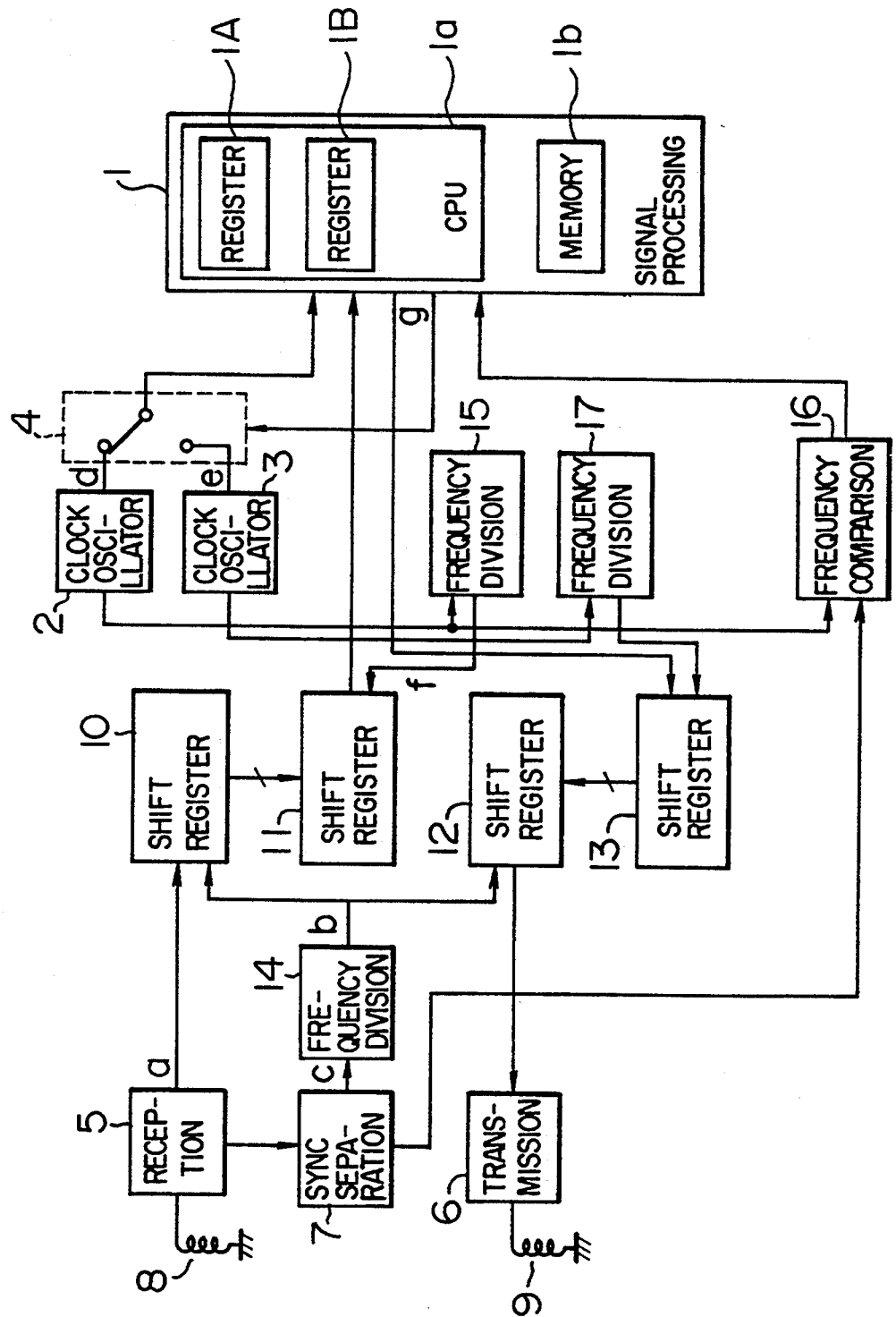

NON-CONTACT IC RECORDING MEDIUM

BACKGROUND OF THE INVENTION

1. Field of the Invention

The present invention relates to a card-shaped or coin-shaped integrated circuit, hereinafter referred to simply as an IC, and more particularly to non-contact IC recording medium provided with a receiving coil and a transmission coil in which, when mounted in a reader/writer, these coils are magnetically connected with the corresponding coils of the reader/writer so that non-contact data transmission/reception paths are formed between the recording medium and the reader/writer.

2. Description of the Prior Art

In recent years, attention has been paid to an IC card incorporating an IC circuit such as a memory to store large capacity data. In order to store data in such an IC card or read the data from the IC card, the IC card is mounted in a reader/writer. Then, the electric contact on the IC card is brought into contact with that of the reader/writer so that the IC card is electrically connected with the reader/writer.

Meanwhile, the electric contact is attached to the IC card so that it is exposed externally. And also, usually such an IC card is always carried with a user so that dust is likely to be stuck to the electric contact or static electricity is likely to be generated there. If dust is stucked to the electric contact, the contact state between the respective electric contacts of the IC card and the reader/writer will become poor. If static electricity is generated at the electric contact of the IC card, a high voltage will be applied to the IC module within the IC card so that the IC module may be destroyed.

In order to obviate these problems, a means of connecting an IC card with a reader/writer through magnetic coupling has been proposed. This is referred to as a non-contact IC card. As disclosed in JP-A-61-226888, in this IC card, a card body is provided with coils for data transmission and data reception whereas a reader/writer is also provided with the corresponding coils for data transmission and data reception. When the non-contact IC card is mounted in the reader/writer, the corresponding coils are magnetically coupled with each other to form two-route data transfer paths having different directions.

In this way, the data transfer paths are formed in a non-contact manner through magnetic coupling so that the above problem attendant on an IC card provided with an electric contact does not arise.

Meanwhile, in order to drive the microcomputer incorporated in the non-contact IC card, a clock signal, hereinafter referred to simply as a clock is required. In a system of the IC card provided with an electric contact, the clock is supplied from the reader/writer to the IC card. Therefore, in the non-contact IC card, it can be proposed to supply the clock from the reader/writer. However, this requires undesired provision of a coil for clock transfer.

In order to obviate such difficulty, it has been proposed to provide a clock generating means within the non-contact IC card. However, this means has also the following defect. In order to stabilize the data transfer rate between the reader/writer and the non-contact IC card, usually, the reader/writer includes a quartz oscillator which is very stable as the clock signal generating means. Therefore, in order for the non-contact IC card to process the data transferred from the reader/writer at such a stable transfer rate and also transfer the processed data to the reader/writer, the clock generating means to be incorporated in the non-contact IC card must be a quartz oscillator which is stable and can generate the clock at the frequency which is exactly equal to that of the clock in the reader/writer. However, it is very difficult to locate the quartz oscillator, which inherently has a comparatively large size and thickness, within a limited inner space of the non-contact IC card.

SUMMARY OF THE INVENTION

An object of the present invention is to solve the problem described above and to provide IC recording medium which can use a means o#generating a clock at a frequency different from that of the clock in a reader/writer.

In order to attain this object, in accordance with the present invention, there is provided a non-contact IC recording medium comprising first means for detecting a synchronization (sync) signal sent from a reader/writer to generate a first clock, second means for generating a second clock having a predetermined frequency relationship with the first clock for driving the data processing in a signal processing circuit incorporated, third means for writing m (m: integer$\geq$2) number of items of transfer information output from the signal processing circuit using the second clock and reading them using the first clock, fourth means for creating an interruption signal from the start bit in at least the first transfer information in the m number of items of transfer information to place the subsequent m number of items of transfer information in a wait state, and fifth means for releasing the wait state of the subsequent m number of items of information by the fourth means using the stop bit in the (m−1)th transfer information the m number of items of information output from the third means.

In operation, the second clock has a frequency higher than the first clock. The m number of items of transfer information output from the signal processing circuit are in synchronism with the second clock. If the third means writes them using the second clock and reads out them using the first clock, the m number of transfer information read out will become synchronous with the first clock so that the reader/writer can take in the transfer information. Thus, the baud rate of the transfer information will be converted so that the information can be taken in the reader/writer by the third means.

In this way, the frequency of the clock used in the non-contact IC recording medium may be different from the clock frequency in the reader/writer and may be varied. Therefore, the clock generating means for the non-contact IC recording medium may be implemented by an oscillator such as a CR oscillator and a ringing oscillator which can be of a relatively small-size and thin unlike a quartz oscillator.

In the signal processing circuit, the subsequent m number of items of information are placed in a wait condition by the fourth means, and their wait condition is released by the fifth means to send m number of items of information to the third means.

As a result, the subsequent m number of items of information will be output from the signal processing circuit after the transfer information stored in the third means is read in order to provide sufficient time lag. Therefore, a situation is presented in connection with the third means where write catches up with and passes read and all items of information output from the signal processing circuit will be transferred with no time lag.

Incidentally, the non-contact IC recording medium in the present invention refers to a recording medium designed in a portable shape such as a card, a coin and a key which can transmit/receive data through magnetic coupling, store the received data in an incorporated memory such as EEPROM located in the recording medium by means of CPU also located within the recording medium, and transmit the data stored in the incorporated memory to a reader/writer through CPU.

BRIEF DESCRIPTION OF THE DRAWINGS

FIG. 5 is a block diagram of further embodiment of the present invention.

DESCRIPTION OF THE PREFERRED EMBODIMENTS

Figure 1A:
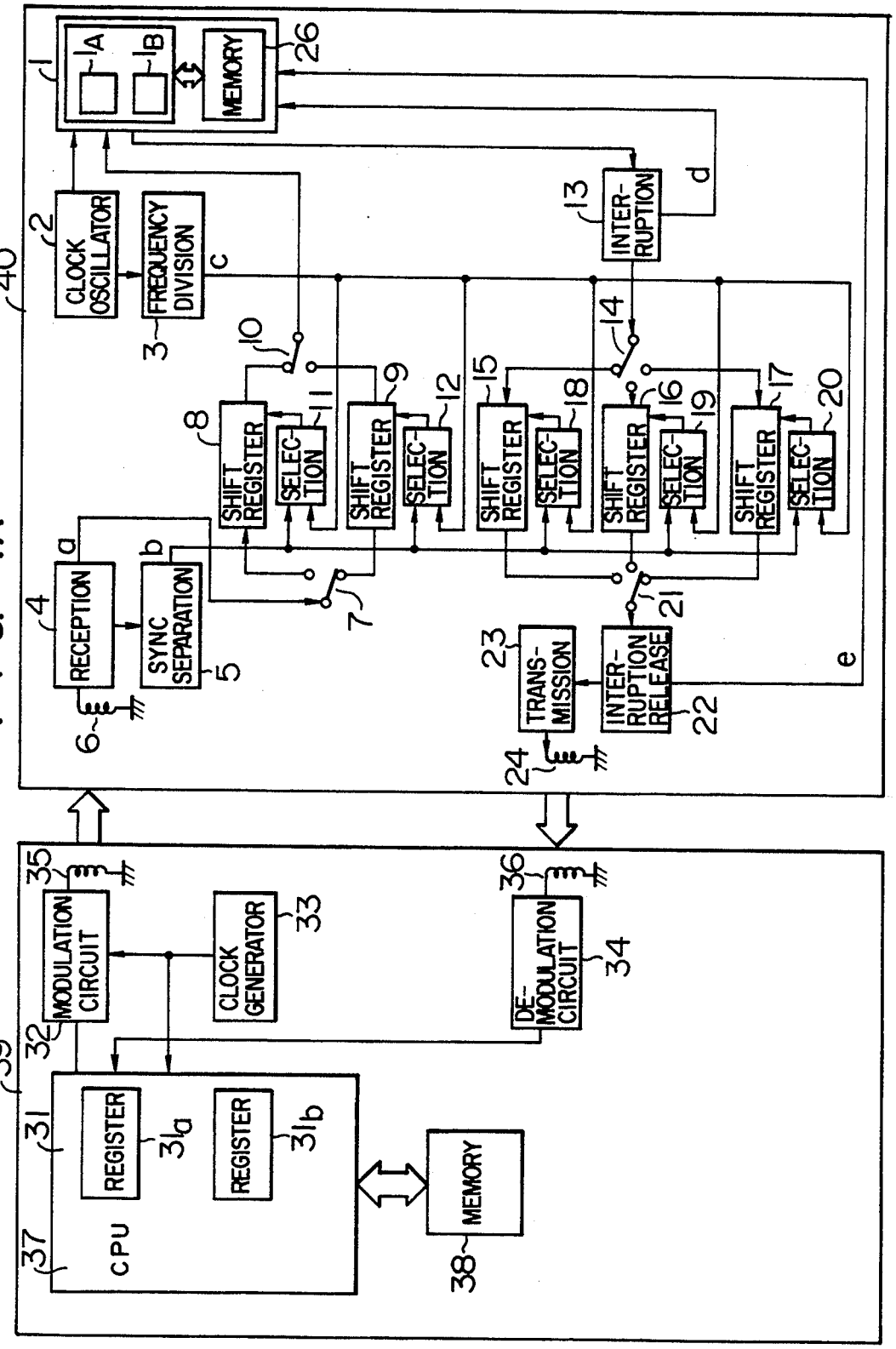
FIG. 1A is a block diagram of one embodiment of the non-contact IC card according to the present invention.

Now referring to the drawings, several embodiments of the present invention will be explained below.

FIG. 1A is a block diagram of one embodiment of the IC card according to the present invention.

In FIG. 1A, 1 denotes a signal processing circuit; 1A and 1B denote registers; 2 denotes a clock generating circuit; 3 denotes a frequency dividing circuit; 4 denotes a receiving circuit; 5 denotes a sync signal separating circuit; 6 denotes a coil; 7 denotes a switch; 8 and 9 denote shift registers; 10 denotes a switch; 11 and 12 are selecting circuits; 13 denotes an interruption generating circuit; 14 denotes a switch; 15 to 17 are shift registers; 18 to 20 denote selecting circuits; 21 denotes a switch; 22 denotes an interruption releasing circuit; 23 denotes a transmission circuit; and 24 denotes a coil.

Figure 1B:
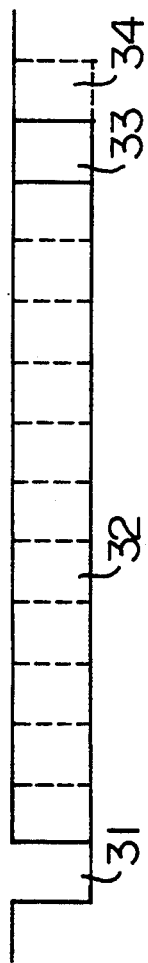
FIG. 1B is a format of transforming information.

In FIG. 1A, when the non-contact IC card 40 is mounted in a reader/writer 39 the coil 6 is magnetically coupled with the corresponding coil 35 of the reader/writer to form a transfer path, and the coil 24 is also magnetically coupled with the corresponding coil 36 of the reader/writer to form another transfer path. Reader/writer 39 controls data stored in memory 38 by CPU37, and transmits them from transmission coil 35 to IC card 40 after being modulated in modulation circuit 32, in synchronism with a clock signal generated in clock generator 33. Meanwhile, data signal transmitted from transmission coil 24 of IC card 40 is received by receiving coil 36, and the data signal is supplied to CPU 37 after being demodulated by demodulation circuit 34. Furthermore, the data signal is processed in CPU 37, and is stored in memory 38 afterwards. Such a state permits data communication to be performed between the non-contact IC card and the reader/writer. The data communication is usually executed in a start-stop synchronization system. As shown in FIG. 1B, the data format in the data communication in the start-stop synchronous system is composed of 11 bits consisting of 1 start bit, 8 data bits, 1 parity bit and 1 stop bit. This information composed of 11 bits will be referred to as transfer information.

In the case of data communication between the reader/writer and the non-contact IC card in the start-stop synchronous system, the data are usually transferred at the transfer rate (baud rate) of 9600 (bps). In the non-contact IC card, in which transfer paths are formed by the magnetic coupling means using coils, the transfer information will be transferred with an amplitude-modulated carrier wave for example.

Now it is assumed that data are to be transferred from the reader/writer 39 to the non-contact IC card 40. In this case, the modulated transfer information sent through the coil 6 is received by the receiving circuit 4 and is subjected to the processing such as demodulation. The transfer information (a) output from the receiving circuit 4 is alternately distributed to the shift registers 8 and 9 by the switch 7. Specifically, the switch 7 selects the shift register 8 to which one item of the information (a) is to be sent, and thereafter the switch 7 selects the shift register 9 to which the subsequent item of the transfer information (a) is to be sent.

The sync signal separating circuit 5 separates a sync signal from the received transfer information to produce a first shift clock (b) in phase with each of the bits of the transfer information. This in-phase clock signal can be detected in terms of e.g. the edge of the start bit of the demodulated transfer information. The shift clock (b) will be produced on the basis of this edge detection timing at the period defined by the above transfer rate of 9600 (bps).

The selection circuit 11, when the transfer information (a) is supplied to the shift register 8 by the switch 7, selects the shift clock (b). Then, each bit of the transfer information is successively transferred into the shift register 8 by the shift clock (b). Thus, the transfer information (a) is stored there. Likewise, the selection circuit 12, when the transfer information (a) is supplied to the shift register 9 by the switch 7, selects the shift clock (b). Thus, the transfer information is stored there.

On the other hand, the clock generated by the clock generating circuit 2 is supplied to the signal processing circuit 1 which includes a CPU (central processing unit), and is also supplied to the frequency dividing circuit 3 which frequency-divides the supplied clock to form a second shift clock (c). It should be noted that the signal processing circuit 1 is driven by a separate clock signal to execute the processing such as data processing.

The clock generating circuit 2 is constituted by an oscillator such as a CR (capacitance-resister) oscillator and ringing oscillator which are different from a quartz oscillator. Although the clock generating circuit 2 is inferior to the quartz oscillator in their stability, its output frequency can be set so that the frequency (c) of the shift clock output from the frequency divider 3 is always higher than that of the shift clock (b) output from the sync separating circuit 5. Since the frequency of the first shift clock (b) is 9600 Hz which is equal to the data transfer rate, the frequency of the second shift clock (c) can be set for e.g. 10,000 Hz which is slightly higher than 9600 Hz. The shift clock (c) is supplied to the selecting circuits 11 and 12.

Immediately after one item of the transfer information has been stored in the shift register 8 in terms of the shift clock (b), the switch 7 is exchanged to select the shift register 9. At the same time, the switch 10 selects the shift register 8 and the selection circuit 11 selects the shift clock (c). Then, each bit of the transfer information stored in the shift register 8 is shifted in synchronism with the shift clock (c) to the output one bit by one bit. Thus, the transfer information will be read out. The transfer information read from the shift register 8 is supplied to the signal processing circuit 1 through the switch 10. Since the transfer information is in synchronism with the shift clock (c) which is obtained by frequency-dividing the clock to be supplied to the signal processing circuit 1, the signal processing circuit 1 can process the transfer information, for example, store it in an EEPROM incorporated in the card.

If a subsequent item of transfer information (a) is output from the receiving circuit while the transfer information is read from the shift register 8, this transfer information will be stored in the other shift register 9. Immediately after write-in of the transfer information in the shift register 8 is completed, the switch 10 is changed to select the shift register 9. The selection circuit 12 selects the shift clock (c) so that the transfer information will be read out from the shift register 9. The transfer information thus read out will be supplied to the signal processing circuit 1 through the switch 10.

In this way, in the case of data reception, one item of transfer information is alternately written or stored in the shift registers 8 and 9 in terms of the clock (b), and the transfer information is immediately read out in terms of the clock (c) from one of the shift registers 8 and 9 on the side in which the write has been completed; the transfer information read out will thereby be supplied to the signal processing circuit 1. This means that the baud rate of the transfer information out of the shift registers 8 and 9 is always defined by the frequency of the clock generated from the clock generating circuit 2. Therefore, even if the clock frequency in the reader/writer which defines the baud rate of the transfer information received by the receiving circuit 4 is not in a fixed relation with the clock frequency of the clock generating circuit 2 so that the frequencies of the first and second shift clocks (b) and (c) are not equal to each other, or the clock frequency of the clock generating circuit 2 is varied, the signal processing circuit 1 can always take in the received transfer information to be processed. For the reason described, the clock generating circuit 2 may be a CR oscillator or ringing oscillator which are inferior to a quartz oscillator in their stability, but can be made small-sized and thin.

The description hitherto made relates to the operation of data reception. Next, the operation of data transmission will be explained.

In this case also, a sync signal is sent with an amplitude-modulated carrier wave through the coil 6 from the reader/writer. Then, the first shift clock (b) at 9600 Hz is produced from the sync signal separating circuit 5. This shift clock is supplied to the selection circuits 18, 19 and 20. The second shift clock (c) at 10,000 Hz produced by the frequency dividing circuit 3 is also supplied to the selecting circuits 18 to 20.

Figure 2:
FIG. 2 is a timing chart of the general information outputting operation in the signal processing circuit in FIG. 1A.

The signal processing circuit 1 reads, from the incorporated EEPROM, the data to be processed and sent to the reader/writer to create the transfer information of 11 bits previously mentioned. The transfer information is stored for each item of information in the two shift registers 1A and 1B and thereafter output therefrom. More specifically, unless an interruption signal (d) is sent from the interruption signal generating circuit 13, as shown in FIG. 2, the two items of created information (A) and (B) are stored in the shift registers 1A and 1B, respectively. Thereafter, the transfer information (A) stored in the shift register 1A is serially output and also the transfer information (B) stored in the shift register 1B is serially transferred to the shift register 1A. Immediately after output of the transfer information (A) is completed, output of the transfer information (B) is started. When the output of the transfer information (B) is completed, the subsequent two items of transfer information (C) and (D) are stored in the shift registers 1A and 1B, respectively. These items of transfer information (C) and (D) will be output from the shift register 1A in the same manner as described above.

In this way, the data are output for every two items of information from the signal processing circuit 1. The transfer information items, once stored in the shift registers 1A and 1B, are automatically output from the signal processing circuit 1 so that output of the transfer information cannot be stopped. The interruption generating circuit 13 serves to stop, in terms of an interruption signal (d), storage of the transfer information in the shift registers 1A and 1B in the signal processing circuit to set the wait state for the transfer information. The interruption releasing circuit 22 serves to release, in terms of an interruption releasing signal (e), the wait state for the transfer information to permit storage of the transfer information in the shift registers 1A and 1B.

Figure 3:
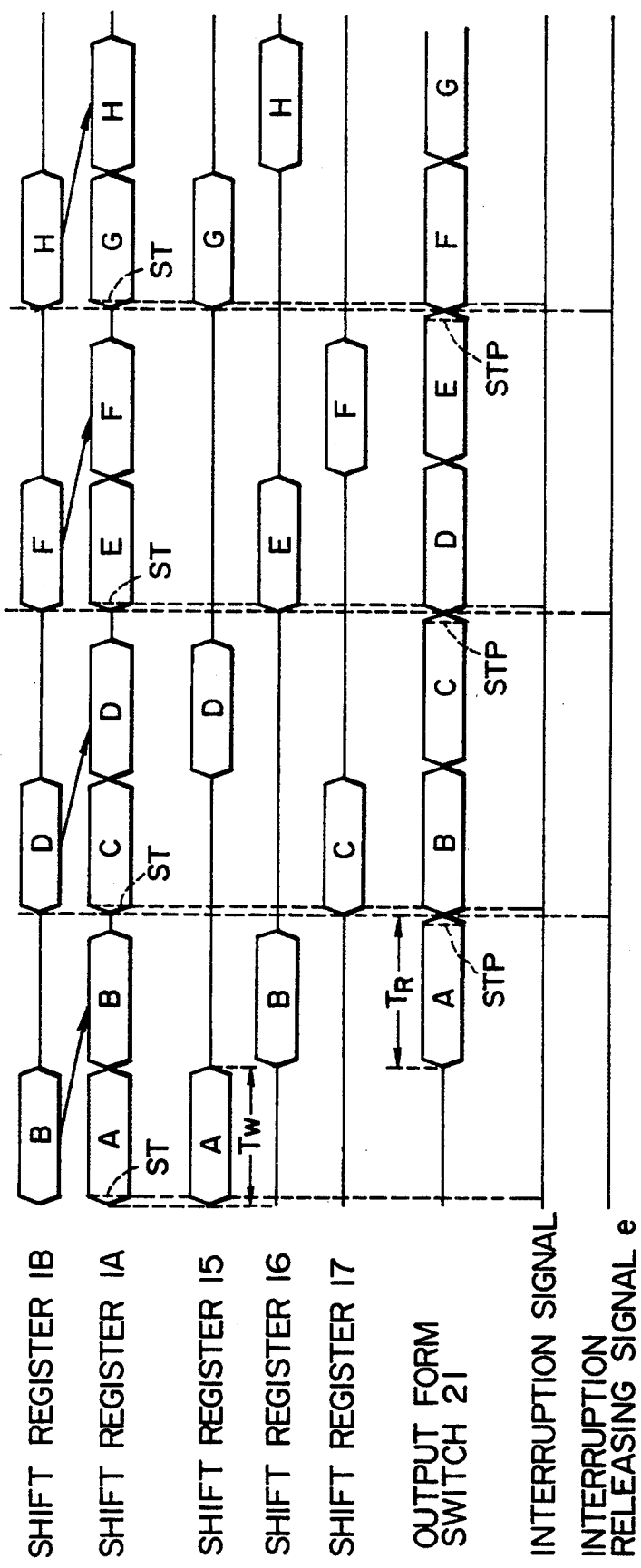
FIG. 3 is a timing chart of the operation of the embodiment of FIG. 1A.

Referring to FIGS. 1A and 3, a more concrete process of the data transfer will be explained below. First, the signal processing circuit 1 causes two items of transfer information (A) and (B) to be stored in the shift registers 1A and 1B, respectively, and outputs the information serially from the transfer information (A). In outputting the transfer information (A), the switch 14 selects the shift register 15 and the selecting circuit 18 selects the shift clock (c) from the frequency dividing circuit 3. The transfer information (A) will be passed through the interruption generating circuit 13 and the switch 14 and supplied to the shift register 15; thus the transfer information (A) will be stored in the shift register 15. Then, the interruption generating circuit 13 detects the start bit of the transfer information (A) to generate the interruption signal (d) so that the signal processing circuit 1 is placed in a wait condition of inhibiting storage of the subsequent items of information (C) and (D) in the shift registers 1A and 1B.

When storage of the transfer information (A) in the shift register 15 is completed, the switch 14 is changed to select shift register 16 and the selecting circuit 19 selects the shift clock (c) so that the transfer information (B) subsequently output from the signal processing circuit will be stored in the shift register 16. Then, although the interruption generating circuit 13 detects the start bit of the transfer information (B), the signal processing circuit 1 has already been placed in the wait state so that it is not necessarily required to generate the interruption signal (d).

Concurrently with the above operation, the selection circuit 18 selects the shift clock (b) sent from the sync separating circuit 5 so that the transfer information (A) will be serially output from the shift register 15. Then, the switch 21 selects the shift register 15. The baud rate of the transfer information (A) output from the shift register 15 is 9600 (bps) which is defined by the shift clock (b), and hence the clock frequency of the reader/writer. The transfer information (A) is passed through the switch 21 and the interruption releasing circuit 22 and subjected to the processing for transmission by the transmission circuit 23. Thereafter, the transfer information (A) will be transferred to the reader/writer through the transfer path.

The interruption releasing circuit 22 detects the stop bit STP of the transfer information (A) to generate an interruption releasing signal, thus releasing the wait state of the signal processing circuit 1.

When storage of the transfer information (B) is completed in the shift register 16, the selection circuit 19 does not select both shift clocks (b) and (c), but places the shift register 16 in a wait condition until read of the transfer information (A) from the shift register 15 is completed. Now, assuming that the frequency of the shift clock (b) is 9600 Hz, that of the shift clock (c) is 10,000 Hz, and the transfer information consists of 11 bits, the time Tw required to store or write the transfer information in the shift register 15 or 16 is $$11 \div 1000 \text{ Hz} = 1.10 \text{ msec}$$

The time Tr required for read is $$11 \div 9600 \text{ Hz} = 1.15 \text{ msec}$$

it can be seen that it takes a longer time for read by 0.05 msec than for write.

When read of the transfer information (A) from the shift register 15 is completed, the switch 21 selects the shift register 16 and the selecting circuit 19 selects the shift clock (b). Thus, the transfer information (B) is read out serially from the shift register 16, and is supplied to the transmission circuit 23 through the switch 21 and the interruption releasing circuit 22. The transfer information (B) is subjected to the processing for transmission by the transmission circuit 23. Thereafter, the transfer information (A) will be transferred to the reader/write through the transfer path.

Then, the interruption releasing circuit 22 does not generate the interruption releasing signal (e) even if it detects the stop bit of the transfer information (B).

Further, when the interruption releasing circuit 22 generates the interruption releasing signal (e) in response to the stop bit STP of the transfer information (A) so that the wait state of the signal processing circuit 1 is released, the subsequent two items of transfer information (C) and (D) stored in the shift registers 1A and 1B will be output in this order. In short, the transfer information (C) starts to be output from the signal processing circuit 1 at substantially the same timing as that of starting to read the transfer information (B) from the shift register 16.

Simultaneously with outputting of the transfer information (C) from the signal processing circuit 1, the switch 14 selects the shift register 17 and the selecting circuit 20 selects the shift clock (c). Thus, the transfer information (C) is stored in the shift register 17. In this case, the interruption generating circuit 13 detects the start bit ST to generate the interruption signal (d), thus placing the signal processing circuit in a wait state.

The succeeding process is the same as the process described above. Specifically, when the writing of the transfer information (C) in the shift register 17 is completed, the switch 21 selects the shift register 17 and the selecting circuit 20 selects the second shift clock (c) so that the transfer information (C) is read out from the shift register 17 and transferred to the reader/writer. Concurrently with this, the switch 14 selects the shift register 15 and the selecting circuit 18 selects the shift clock (c) so that the subsequent transfer information output from the signal processing circuit 1 is stored in the shift register 15.

Then, the interruption releasing circuit 22 detects the stop bit STP of the transfer information (C) output from the shift register 17 to generate the interruption releasing signal (e), thereby releasing the wait state of the signal processing circuit 1. Thus, write of the subsequent items of transfer information (E) and (F) in the shift registers 1A and 1B is permitted. At this time, the write of the transfer information (D) in the shift register 15 has been already completed.

Successively, the same operation as described above will be repeated. However, attention should be paid to the following matter. The interruption generating circuit 13 may generate the interruption signal (d) for each start bit of the transfer information supplied. On the other hand, the interruption releasing signal (e) should be generated for each stop bit of the transfer information to be earlier output of two items of the transfer information simultaneously stored in the shift registers 1A and 1B. This can be realized by counting the detected stop bit of each transfer information and generating the interruption releasing signal (e) only when the counted value is $2n-1$ ($n=1, 2, 3, \ldots$).

On the basis of the operation explained hitherto, write of two items of transfer information in the shift registers 1A and 1B is always made when two items of transfer information have been read from two shift registers of shift registers 15 to 17. Therefore, if the two items of transfer information are serially output from the signal processing circuit, two of the shift registers 15 to 17 are necessarily vacant. Accordingly, the write of the transfer information will never catch up with its read.

As a result, even if the clock frequency in the reader/writer is different from that in the non-contact IC card, and the clock frequency in the non-contact IC card varies, the shift registers 15 to 17 can convert the baud rates of data transfer between the reader/writer and the non-contact IC card and also within the non-contact IC card so that they are in the required rates.

Additionally, although in the above embodiment, the signal processing circuit 1 includes two shift registers and the transfer information is output for every two items of information, shift registers to the number of m (m: integer $\geq 2$) may be provided and the transfer information may be output for every m items of information. In this case, it should be noted that shift registers to the number of (m+1) are provided instead of three shift registers 15 to 17, and the interruption releasing circuit 22 generates the interruption releasing signal (e) in response to the stop bit of the (m−1)th information of m items of transfer information.

Further, although in the embodiment described above the receiving coil 6 and the transmission coil 24 are individually provided, one coil having both functions may be used so that the signal passing through a communication control circuit is separately controlled for the receiving circuit 4 and the transmission circuit 23.

Figure 4:
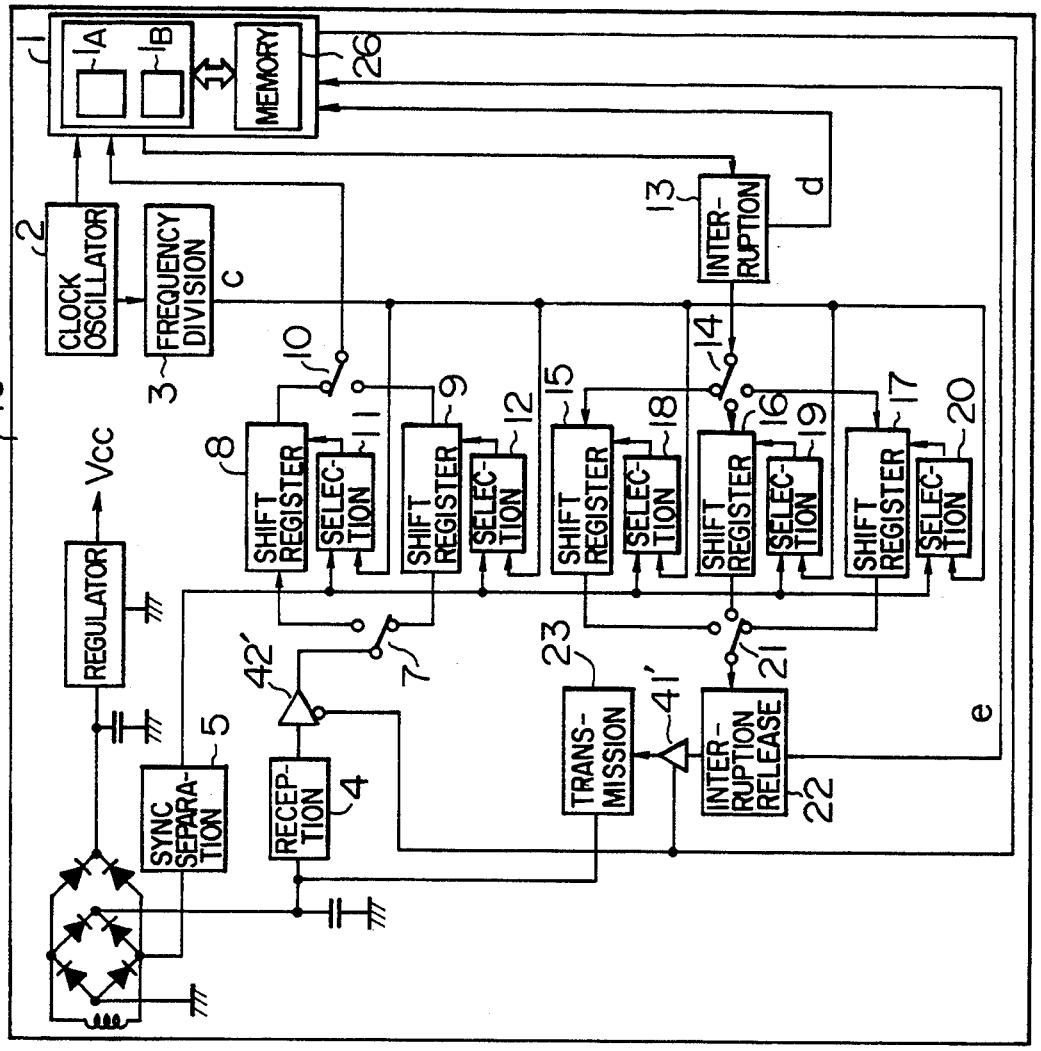
FIG. 4 is a block diagram of another embodiment of the non-contact IC card according to the present invention.

In FIG. 4, the modified embodiment is shown. In the structure of FIG. 4, reception and transmission of transfer information through input/output coil 6 is carried out by input gate 42, 42', and output gate 41, 41' which are controlled by CPU.

In accordance with this embodiment, the oscillator which is inferior to a quartz oscillator in their stability and serves to generate the clock at the frequency different from that of the clock used in the reader/writer can be used as clock generating means to perform the data processing in the signal processing circuit incorporated in a non-contact IC card and the data transfer between it and the reader/writer.

Now referring to FIG. 5 an explanation will be given of another embodiment of the present invention. FIG. 5 is a block diagram of another embodiment of the non-contact IC card according to the present invention.

In FIG. 5, 1 denotes a signal processing circuit; 1A and 1B denote registers; 2 and 3 denote clock generating circuits; 4 denotes a clock exchange circuit; 5 denotes a reception circuit; 6 denotes a transmission circuit; 7 denotes a sync signal separating circuit; 8 denotes a receiving coil; 9 denotes a transmission coil 10, 11, 12 and 13 denotes shift registers; 14 and 15 denote frequency dividing circuits; 16 denotes a frequency comparison circuit; and 17 denotes a frequency division circuit.

In FIG. 5, if the non-contact IC card is mounted in a reader/writer (not shown), the receiving coil 8 is magnetically coupled with the corresponding coil of the reader/writer to form a transfer path, and the transmission coil 9 is also magnetically coupled with the corresponding coil of the reader/writer to form another transfer path. Such a state permits data communication to be performed between the non-contact IC card and the reader/writer. The data communication is usually executed in a start-stop synchronization system. The data format of the data communication in the start-stop synchronous system consists of 11 bits including 1 start bit, 8 data bits, 1 parity bit and 1 stop bit. This information composed of 11 bits will be referred to as transfer data.

In the case of data communication between the reader/writer and the non-contact IC card in the start-stop synchronous system, the data are usually transferred at the transfer rate (baud rate) of 9600 (bps). In the non-contact IC card, in which transfer paths are formed by the magnetic coupling means using coils, the transfer data will be transferred with an amplitude-modulated carrier wave, for example.

Now it will be assumed that data are to be transferred from the reader/writer to the non-contact IC card. In this case, the modulated transfer data sent through the coil 8 is received by the receiving circuit 5 and is subjected to processing such as demodulation.

The sync signal separating circuit 7 and the frequency dividing circuit 14 separate the sync signal from the received transfer data to produce a shift clock (b) in phase with each of the bits of the transfer data. This in-phase signal can be detected in terms of e.g. the edge of the start bit of the demodulated transfer data. The shift clock (b) will be produced on the basis of this edge detection timing at the period defined by the above transfer rate of 9600 (bps).

The transfer data are stored in synchronism with the clock (b) in the shift register 10. As soon as the stop bit of the transfer data (a) has been stored in the shift register 10, the transfer data (a) of 11 bits are collectively transferred to the shift register 11 and stored therein.

On the other hand, the clock generated by the clock generating circuit 2 or 3 is supplied to the signal processing circuit 1 which is a CPU (central processing unit), and the output from the clock generating circuit 2 is supplied to the frequency dividing circuit 15 which frequency-divides the supplied clock to form a shift clock (f). It should be noted that the signal processing circuit is driven by a clock to execute the processing such as data processing. Incidentally, the transfer data thus received is stored in the memory such as an EEPROM by the CPU.

Now it assumed that the clock generating circuit 2 is constituted by e.g. a CR oscillator, and generates a second clock (d) at the frequency which is always higher than that of a first clock (c) output from the sync signal separating circuit 7. And it is also assumed that the clock generating circuit 3 is constituted by e.g. a CR oscillator, and generates a third clock (e) at the frequency which is always lower than that of the clock (c) output from the sync signal separating circuit 7. Therefore, the frequency relationship among the clocks (d), (e) and (c) produced from the clock generating circuits 2 and 3, and the sync signal separating circuit 7 can be represented by $$d > c > e.$$

Immediately after storage of one item of transfer data in the shift register 10 has been completed, the transfer data of 11 bits are collectively transferred to the shift register 11 and stored therein. Each of the bits of the transfer data stored in the shift register 11 is shifted in synchronism with the shift clock (f) to be output one bit by one bit. Thus, the transfer data will be read out. Since the transfer data are in synchronism with the shift clock (f) which is obtained by frequency-dividing the clock to be supplied to the signal processing circuit 1, the signal processing circuit 1 can process the transfer data. Further, since the shift clock (f) has the relationship of f>b with the shift clock (b), the transfer data serially transferred will never overflow from the shift register.

This means that the baud rate of the transfer data output from the shift register 11 is always defined by the frequency of the clock generated from the clock generating circuit 2. Therefore, even if the clock frequency in the reader/writer which defines the baud rate of the transfer data received by the receiving circuit 5 is not in a fixed relation with the clock frequency of the clock generating circuit 2 so that the frequencies of the shift clocks (b) and (f) are not equal to each, or the clock frequency of the clock generating circuit 2 is varied, the signal processing circuit 1 can always take in the received transfer data to be processed. For the reason described, the clock generating circuit 2 may be a CR oscillator which is inferior to a quartz oscillator in their stability, but can be made small-sized and thin.

The description hitherto made relates to the operation of data reception in this embodiment. Next, the operation of data transmission will be explained.

In this case also, a carrier wave is sent through the receiving coil 8 from the reader/writer. Then, the shift clock at 9600 Hz is produced through the sync signal separating circuit 7 and the frequency dividing circuit 14.

On the other hand, the output from the frequency division circuit 3 is transfer data (g) in synchronism with the shift clock (h) which is obtained by frequency-dividing the clock (e) from the clock generating circuit 3. The transfer data are previously stored in the memory such as an EEPROM and their transfer is controlled by CPU. The transfer data are stored in the shift register 13 one bit by one bit. Immediately after the 11 bits or data have been collectively stored in the shift register 12, the transfer data (g) stored in the shift register 12 is transferred to the transmission circuit 6 in synchronism with the shift clock (b) one bit by one bit and thereafter transferred to the reader/writer through the transmission coil.

As a result, even if the clock frequency in the reader/writer is different from that in the non-contact IC card and the clock frequency in the non-contact IC varies, the shift registers 10 to 13 can convert the baud rates of data transfer between the reader/writer and the non-contact IC card and also within the non-contact IC card.

Further, although in the embodiment described above the receiving coil 8 and the transmission coil 9 are individually provided, one coil having both functions may be used so that the signal passing through a communication control circuit is separately controlled for the receiving circuit 5 and the transmission circuit 6.

Finally, an explanation will be given of a method for detecting the temperature in the non-contact IC card according to this embodiment. When the non-contact IC card is mounted in the reader/writer (not shown), the non-contact IC card is activated and also supply of the carrier wave from the reader/writer starts. Thus the clock (c) is produced from the sync signal separating circuit 7 and the clock (d) is produced from the clock generating circuit 2. The difference between the frequencies of these clocks (c) and (d) is detected by a frequency comparing circuit 16 and the data is sent to the signal processing circuit 1. The signal processing circuit 1 takes in the data at regular time intervals. A difference between the data first taken in and that later taken in is compared with the data stored in the register 1b of the signal processing circuit 1, thus detecting the temperature of the entire circuit.

In this type of IC card, generation of heat in the electric power circuit after continuous operation is observed. For avoiding deformation of the IC card or erroneous operation on account of the generated heat, it is necessary to make an alert or cut off circuitry automatically to inhibit use of the IC card when its temperature exceeds a certain limit. The detection of temperature is carried out by comparing a frequency deviation of the CR oscillator which is caused by temperature rise with a synchronising signal supplied from reader/writer 39, and as a result an operation of CPU1 can be stopped by the detection.

Furthermore in the IC recording medium of the invention, processing speed is increased in order to realize more rapid processing comparing to a conventional IC recording medium in which the CPU is operated in synchronism will be synchronization signal supplied from reader/writer by having the CPU of this invention operated by a clock signal of higher frequency than a synchronization signal supplied from the reader/writer.

I claim:

1. A non-contact integrated circuit recording medium having a receiving coil and a transmission coil and a signal processing circuit which outputs, during a data transmission, data at least provided with a start bit and a stop bit for every m (where m is an integer of 2 or greater) items of transfer information, and wherein during data transmission and reception, a synchronization signal is received from a reader/writer through the receiving coil, comprising:

first means for detecting a sync signal sent from the reader/writer and generating therefrom a first clock signal having a frequency corresponding to a data transfer rate between a recording medium and the reader/writer;

second means for generating a second clock signal having a frequency greater than the first clock signal for driving a signal processing circuit at a higher rate than said first clock signal;

third means including temporary transfer information storage means for writing m (where m is an integer of 2 or greater) number items of transfer information from the signal processing circuit into said temporary storage means using the second clock signal, reading said items out of said temporary storage means using the first clock signal and transferring said m number of items of transfer information to said reader/writer in synchronism with said first clock signal;

fourth means for generating an interruption signal from the start bit in at least a first item of transfer information of the m number of items of transfer information output from said signal processing circuit to place subsequent items of transfer information of the m number of items of transfer information in a wait state; and fifth means for generating an interruption signal for each stop bit in a (m−1)th item of transfer information of the m number of items of information output from the third means, thus terminating the wait state of the subsequent number of items of transfer information by said fourth means so as to permit their serial output from the signal processing circuit, whereby said transfer information output from said third means is transferred to said reader/writer through said transmission coil.

2. A non-contact integrated circuit recording medium according to claim 1, wherein said second means for generating the second clock signal comprises a CR oscillator.

3. A non-contact integrated circuit recording medium according to claim 1, wherein said temporary information storage means comprise shift register means.

4. A non-contact integrated circuit recording medium according to claim 1, wherein said signal processing circuit includes a plurality of shift registers.

5. A non-contact integrated circuit recording medium according to claim 1, wherein said medium is in the shape of a card.

6. A non-contact integrated circuit recording medium having a receiving coil, a transmission coil, and a signal processing circuit which serves to execute signal transmission and reception in a start-stop synchronization manner, wherein during data transmission and reception a sync signal is received through said receiving coil, comprising:

first means for detecting a sync signal coupled from a reader/writer and generating a first clock signal therefrom at a frequency corresponding to a predetermined data transfer rate between the recording medium and the reader/writer;

second means for generating a second clock signal and a third clock signal having a predetermined frequency relationship with the first clock signal for driving the signal processing circuit, the frequency of said second clock signal being higher than that of said first clock signal, the frequency of said third clock signal being lower than that of said first clock signal; and third means including storage means for writing the transfer data serially output from the signal processing circuit into said storage means in synchronism with said third clock signal, reading the transfer data out of said storage means in synchronism with the first clock signal and transferring the transfer data to said reader/writer in synchronism with said first clock signal, said third means additionally including means for writing the transfer data transmitted from a reader/writer into said storage means in synchronism with the first clock signal, and for reading and transferring said transfer data out of said storage means in synchronism with the second clock signal to said signal processing circuit, whereby said transfer data output from said third means is transferred to said reader/writer through said transmission coil.

7. A non-contact IC recording medium according to claim 6, wherein a frequency difference or a phase difference between said first clock signal, said second clock signal or said third clock signal is generated and stored in said signal processing circuit prior to signal transmission/reception, and wherein a change in the frequency difference or the phase difference is detected to detect a temperature change in the signal processing circuit.

8. A non-contact integrated circuit recording medium comprising:

first means for detecting a sync signal coupled to the recording medium from a reader/writer and generating therefrom a first clock Signal at a frequency corresponding to a predetermined data transfer rate between the recording medium and the reader/writer;

second means for generating a second clock signal having a predetermined frequency relationship with the first clock signal for driving the signal processing circuit at a higher frequency than said first clock signal;

third means including storage means for writing transfer information which is in synchronism with a synchronization signal received from the reader/writer into said storage means, reading said transfer information from said storage means using the second clock signal and coupling said transfer information to the signal processing circuit, whereby a processing of said transfer information is processed in synchronism with said second clock signal.

9. A non-contact integrated circuit recording medium according to claim 8, wherein said storage means of said third means comprise shift registers.

10. A method for operating a non-contact integrated circuit recording medium having a receiving coil, a transmission coil and a signal processing circuit which outputs, during a data transmission, data including at least a start bit and a stop bit for every m (where m is an integer of 2 or greater) items of transfer information, and wherein, during data transmission and reception, a synchronization signal is received from a reader/writer through the receiving coil, comprising the steps of:

generating a first clock signal having a frequency corresponding to a data transfer rate between a recording medium and the reader/writer from a sync signal sent from the reader/writer;

generating a second clock signal having a frequency greater than the first clock signal for driving said signal processing circuit at a higher rate than said first clock signal;

writing m (where m is an integer of 2 or greater) number of items of transfer information output from said signal processing circuit into temporary transfer information storage means using the second clock signal, reading said items out of said temporary storage means using the first clock signal, and transferring said m number of items of transfer information to said reader/writer in synchronism with said first clock signal.

* * * * *